United States Patent
Hance et al.

(10) Patent No.: US 10,175,742 B2
(45) Date of Patent: Jan. 8, 2019

(54) BACKUP POWER AND LOAD DISCOVERY

(71) Applicant: HEWLETT PACKARD ENTERPRISE DEVELOPMENT LP, Houston, TX (US)

(72) Inventors: Edgar Hance, Houston, TX (US); James A. Fuxa, Houston, TX (US); Justin H. Park, Houston, TX (US); David K. Altobelli, Houston, TX (US); Marc W. Galloway, Spring, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 80 days.

(21) Appl. No.: 15/314,733

(22) PCT Filed: Sep. 5, 2014

(86) PCT No.: PCT/US2014/054292
§ 371 (c)(1),
(2) Date: Nov. 29, 2016

(87) PCT Pub. No.: WO2016/036383
PCT Pub. Date: Mar. 10, 2016

(65) Prior Publication Data
US 2017/0192489 A1 Jul. 6, 2017

(51) Int. Cl.
G06F 1/00 (2006.01)
G06F 1/26 (2006.01)
G06F 1/32 (2006.01)
G06F 1/18 (2006.01)
H02J 9/06 (2006.01)
(Continued)

(52) U.S. Cl.
CPC .......... *G06F 1/3287* (2013.01); *G06F 1/189* (2013.01); *G06F 1/263* (2013.01); *G06F 1/3225* (2013.01); *G06F 9/4406* (2013.01); *G06F 21/572* (2013.01); *H02J 9/061* (2013.01)

(58) Field of Classification Search
CPC .................................................... G06F 1/3287
See application file for complete search history.

(56) References Cited

U.S. PATENT DOCUMENTS

| 8,745,125 | B2* | 6/2014 | McDysan | H04L 29/08 709/202 |
| 2008/0144519 | A1* | 6/2008 | Cooppan | H04L 41/142 370/252 |

(Continued)

OTHER PUBLICATIONS

"Dell Poweredge C System Management," Aug. 2011, http://poweredgec.com/files/QSG_PowerEdge_C_System_Management.pdf.

(Continued)

*Primary Examiner* — Mohammed H Rehman
(74) *Attorney, Agent, or Firm* — Brooks, Cameron & Huebsch, PLLC

(57) ABSTRACT

A backup power and load discovery system can include a shared backup power supply controlled by a backup power control module, and a node coupled to the shared backup power supply, wherein the node supports a plurality of loads and includes system firmware to determine a subset of the plurality of loads that are to be protected by the shared backup power supply; and the system firmware to communicate the subset between the node and the shared backup power control module.

20 Claims, 6 Drawing Sheets

(51) Int. Cl.
　　　G06F 9/4401　　　(2018.01)
　　　G06F 21/57　　　(2013.01)

(56) References Cited

U.S. PATENT DOCUMENTS

| | | |
|---|---|---|
| 2009/0316707 A1* | 12/2009 | Hawley .................. H04L 12/10 |
| | | 370/401 |
| 2011/0145618 A1 | 6/2011 | Andresen |
| 2012/0033676 A1 | 2/2012 | Mundra |
| 2012/0116590 A1 | 5/2012 | Florez-Larrahondo |
| 2012/0209441 A1* | 8/2012 | Hirata .................. H01M 10/44 |
| | | 700/292 |
| 2012/0311368 A1 | 12/2012 | Zhang |
| 2013/0043853 A1 | 2/2013 | Fu et al. |
| 2013/0099756 A1 | 4/2013 | Mohr |
| 2013/0154662 A1* | 6/2013 | Guo .................. G01R 31/2868 |
| | | 324/537 |
| 2013/0169046 A1 | 7/2013 | Shin |
| 2014/0183948 A1 | 7/2014 | Hulbert |
| 2014/0232350 A1 | 8/2014 | Chan |
| 2014/0300364 A1* | 10/2014 | Choi ....................... H04Q 9/00 |
| | | 324/426 |

OTHER PUBLICATIONS

PCT/ISA/KR, International Search Report dated May 8, 2015, 11 pps., PCT/US2014/054292.

* cited by examiner

BACKUP POWER AND LOAD DISCOVERY

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Backup power supplies may sometimes include energy components such as capacitors or batteries.

DETAILED DESCRIPTION

Figure 1:
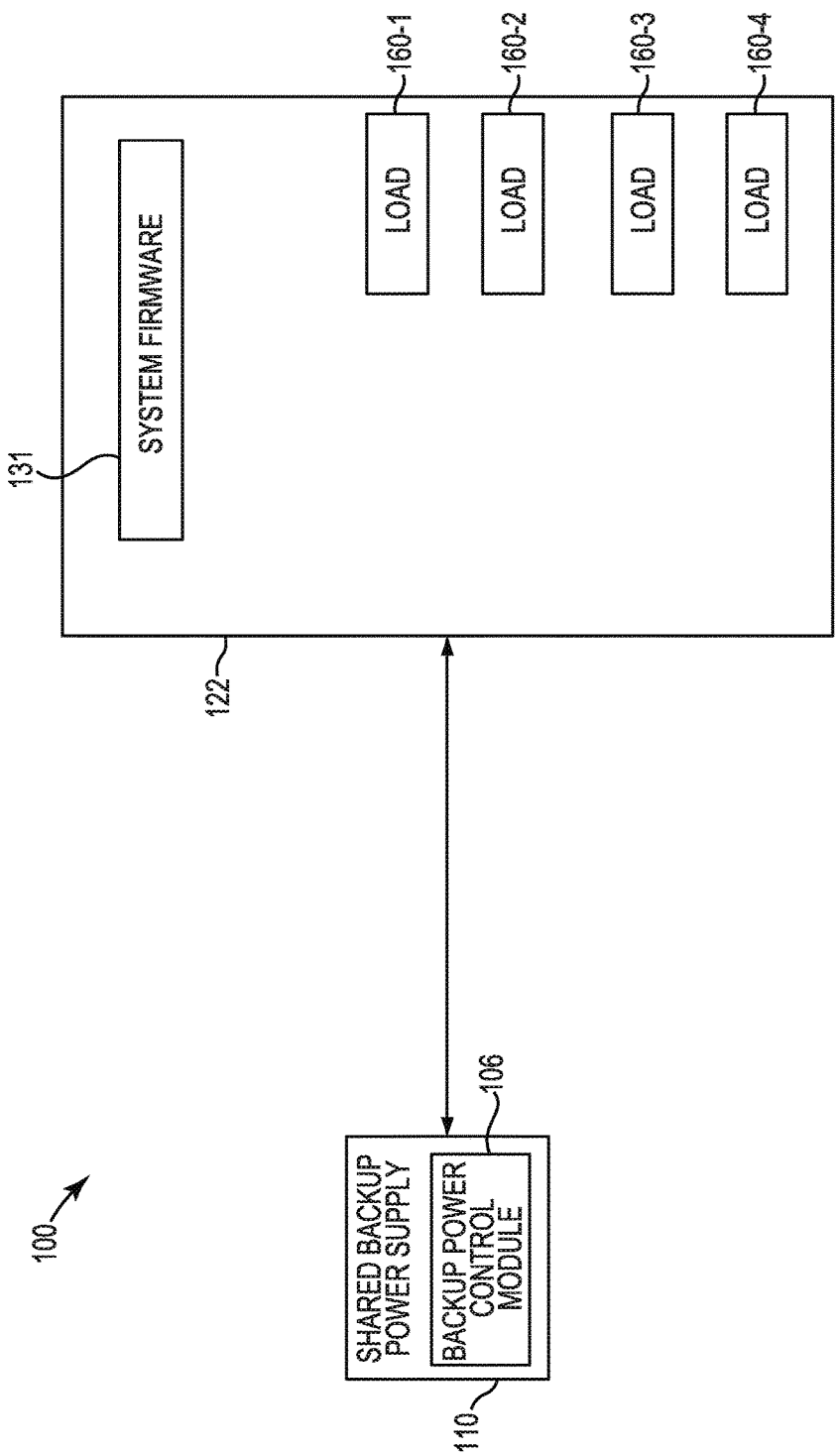
FIG. 1 illustrates a block diagram of an example of a system for backup power and load discovery according to the present disclosure.

A computing data storage system can include a number of nodes that support a number of loads. The nodes can be a number of servers, for example. A number of loads can include storage controllers or devices associated with the servers. For example, a load can include cache memory, dual inline memory modules (DIMMs), Non-Volatile Dual In-Line Memory Modules (NVDIMMs), and/or array control logic, among other storage controllers and/or devices associated with the servers. A computing data storage system can include a backup power system operatively coupled to the number of nodes to support the number of loads in an event of a removal of a primary power supply. The power system can include an error detection module that detects errors within a backup power and load discovery system, and a backup power controller module that determines a number of loads that are to be protected with backup power from the backup power supply, and configures the backup power supply to provide backup power to the loads.

A removal of a primary power supply can be scheduled or un-scheduled. For instance, a scheduled removal of the primary power supply can be the result of scheduled maintenance on the number of nodes and/or the number of loads. A scheduled removal of the primary power supply can be an intentional power down of the number of nodes and/or the number of loads to add and/or remove nodes to a chassis and/or network connected to a primary power supply. In another example, a scheduled removal of the primary power supply can be an intentional power down to add and/or remove one or more loads to or from one or more nodes.

An un-scheduled primary power supply removal can be a failure in the primary power supply. An un-scheduled primary power supply removal can occur when, for example, the primary power supply fails momentarily and/or for an extended period of time.

It may be desirable to move data from cache memory in the number of nodes to non-volatile memory upon the removal of a primary power supply. However, moving data from cache memory to non-volatile memory can involve a power supply. A backup power supply can be a secondary power supply that is used to provide power for moving data from cache memory to non-volatile memory when the primary power is removed.

Providing backup power for moving data from cache memory to non-volatile memory may include providing each node with a separate, shared backup power supply, rather than providing a backup power supply for each load within a node. That is, a single node containing a number of loads can be connected to a single shared backup power supply. In contrast, other backup power supply solutions may provide a dedicated backup power supply for each load within a node, and therefore a single node could contain a plurality of backup power supplies.

When the shared backup power supply is directly attached to each of the number of loads within a node, each of the number of loads may be able to determine the state of the shared backup power supply. As used herein, the state of the shared backup power supply refers to the charge level of the shared backup power supply, the presence of the shared backup power supply itself, and/or the presence of charging errors in the shared backup power supply. With a shared backup power supply, the number of loads may only see the output from the shared backup power supply after the shared backup power supply has charged and enabled its output to the number of loads (e.g., the backup power supply is providing power to the number of loads). Therefore, the number of loads cannot ascertain whether the shared backup power supply is installed (e.g., present) and/or if it is off-line and charging.

In accordance with examples of the present disclosure, backup power and load discovery can allow the number of loads within a node to determine the state of the shared backup power supply before the shared backup power supply enables its output. In addition, backup power and load discovery can allow the number of loads within a node to compare the true state of the shared backup power supply with the state of the shared backup power supply as known by the loads, and determine if a discrepancy exists. As used herein, the true state of the shared backup power supply is the state of the shared backup power supply, as determined by the shared backup power supply itself. Determining if a discrepancy in the state of the shared backup power supply exists allows for the detection of cabling errors between a load and the shared backup power supply. As used herein, a cabling error refers to an error in a connection between a load and the shared backup power supply. For instance, a cabling error can be an improperly installed cable and/or a defective cable which results in no connection from the shared backup power supply to the load. Further, determining if a discrepancy in the state of the shared backup power supply exists allows the load to receive out-of-band notifications about the shared backup power supply such as failure information.

FIG. 1 illustrates a block diagram of an example of a system 100 for backup power and load discovery according to the present disclosure. As illustrated in FIG. 1, the system 100 can include a shared backup power supply 110, a backup power control module 106, and a node 122 coupled to the shared backup power supply. The shared backup power supply can be controlled by the backup power control module 106, as discussed further in relation to FIGS. 2-6. Furthermore, the node 122 can support a plurality of loads (e.g., load 160-1, load 160-2, load 160-3, and load 160-4, collectively referred to herein as loads 160). For instance, the node 122 can support a number of storage controllers and/or a number of storage devices such as NVDIMMs.

The node 122 can include system firmware 131 that enables communication between the shared backup power supply 110 and the plurality of loads 160. System firmware can be computer executable instructions stored on the node 122. Examples of system firmware can include Basic Input/Output System (BIOS), and a Baseboard Management Controller (BMC) unit. BIOS provides initialization and testing of the hardware components of the node 122 and loads an operating system for the node when it is powered on. The BMC unit can be a specialized microcontroller embedded on the motherboard of the node 122, and that manages the interface between system management software and platform hardware. While examples herein use BIOS and a BMC unit as examples of system firmware, examples of the present disclosure are not so limited. Other types of system firmware can be used to perform the various examples described in this disclosure. Furthermore, while specific examples are outlined herein, describing actions performed by BIOS and by a BMC unit, examples are not limited. Actions described as being performed by BIOS can be performed by a BMC unit and/or other types of system firmware. Similarly, actions described as being performed by a BMC unit can be performed by BIOS and/or other types of system firmware.

The system firmware 131 can determine a subset of the plurality of loads 160 that are to be protected by the shared backup power supply. For example, BIOS can determine a subset of the plurality of loads 160 that are to be protected by the shared backup power supply 110 and can communicate, via a BMC unit, identification of the subset to the shared backup power supply 110. For instance, the BIOS can determine that loads 160-1 and 160-2 are to receive backup power from the shared backup power supply 110 in the event of a removal of the primary power supply, and can communicate identification of loads 160-1 and 160-2 to the shared backup power supply 110. Examples are not so limited, however, and more than one subset of the plurality of loads 160 can be identified.

The system firmware can perform a number of other functions related to backup power and load discovery. For instance, BIOS can determine a current charge level of the shared backup power supply 110. Based on the current charge level of the shared backup power supply 110, BIOS can also determine an amount of time it will take for the shared backup power supply 110 to charge in order to provide backup power to the loads 160 and/or a subset of the loads 160.

Furthermore, the system firmware can communicate between the node 122 and the shared backup power supply 110, identification of the subset of the plurality of loads 160 that are to be protected by the shared backup power supply. For example, a BMC unit can communicate the subset of the plurality of loads (e.g., loads 160-1 and 160-2 in the example presented above) between node 122 and the shared backup power control module 106. In a number of examples, the system 100 is configured such that the only output the plurality of loads 160 receive directly from the shared backup power supply is a battery power output from the shared backup power supply 110.

Figure 2:
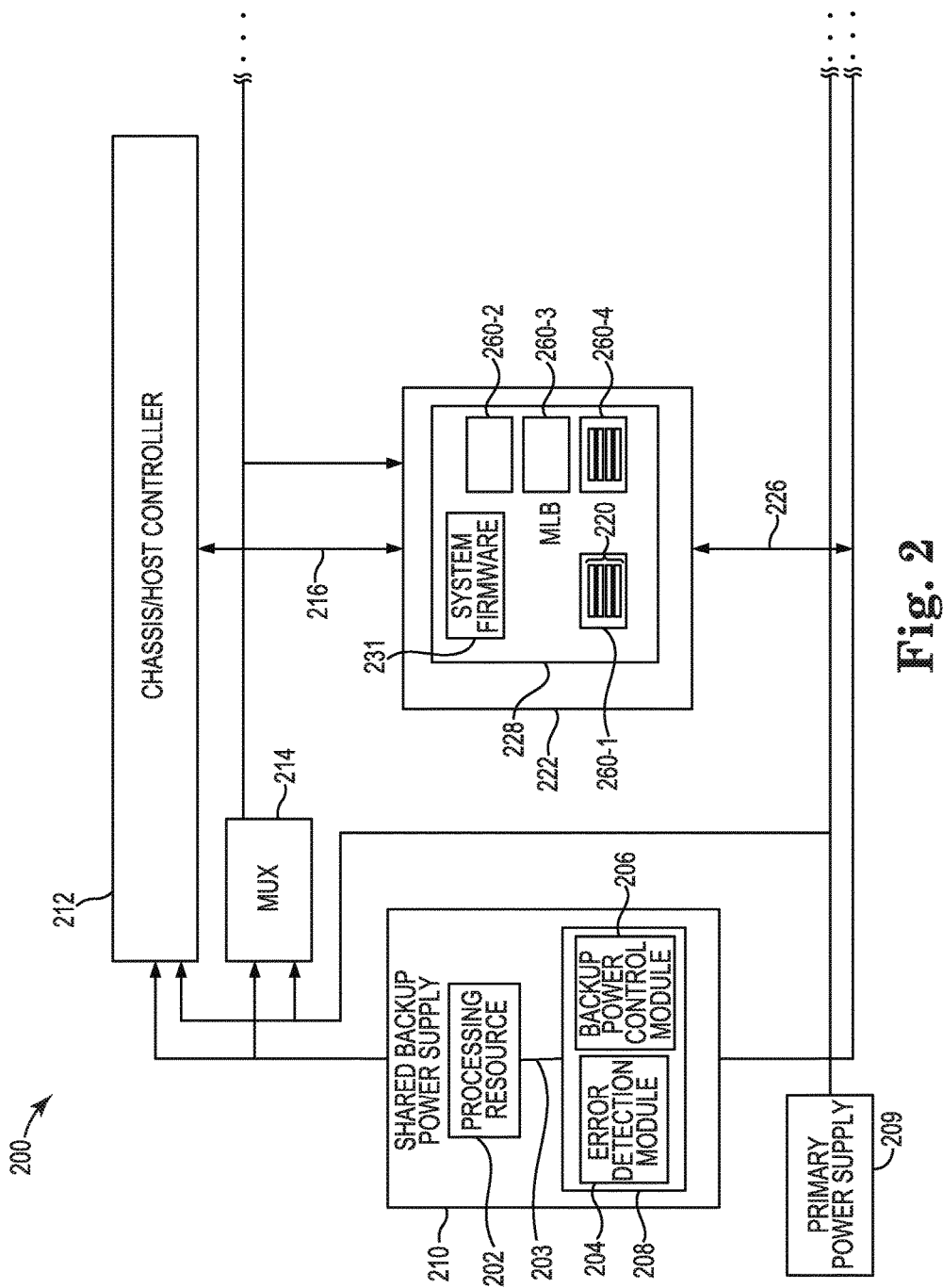
FIG. 2 illustrates a detailed block diagram of an example of a system for backup power and load discovery according to the present disclosure.

As described further in relation to FIG. 2, the backup power and control module 106 can perform a number of functions to control the shared backup power supply 110. For example, the system firmware 131 can determine a subset of the loads 160 that are to be protected by the shared backup power supply 110. In response to determining the subset of the loads 160, the backup power control module 106 can configure the shared backup power supply to charge in order to provide backup power to the subset of the loads 160. As discussed further in relation to FIG. 4, this determination can be performed during startup (e.g., boot) of the node 122.

FIG. 2 illustrates a detailed block diagram of an example of a system 200 for backup power and load discovery according to the present disclosure. FIG. 2 includes the shared backup power supply 210 a multiplexer (MUX) 214, a chassis/host controller 212, and the node 222.

As illustrated in FIG. 2, the node 222 can host a number of loads (e.g., loads 260-1, 260-2, 260-3, 260-4, collectively referred to herein as loads 260). For instance, the node 222 can include a number of devices, such as local memory or data storage (e.g., referred generally as memory). The memory may contain volatile and non-volatile memory, e.g., cache and non-volatile memory dual inline memory modules (NVDIMM). Thus, each memory in the node 222 can contain a number of NVDIMM slots 220. Each NVDIMM slot among the number of NVDIMM slots 220 can provide a load to the system 200. Node 222 can include other devices such as cache memory, DIMMs, array control logic, and storage controllers, among other devices associated with the node 222, and each of the devices associated with the node 222 can provide a load to the system 200. For instance, load 260-2 can be provided by a storage controller, whereas each NVDIMM slot among the number of NVDIMM slots 220 can provide load 260-1. In some examples, the node 222 can also include a control logic unit (not illustrated in FIG. 2).

The shared backup power supply 210 can include a processing resource 202 connected via a connection 203 to a memory resource 208, e.g., a computer-readable medium (CRM), machine readable medium (MRM), database, etc. In some examples, memory resource 208 may be a non-transitory storage medium, where the term "non-transitory" does not encompass transitory propagating signals. The memory resource 208 can include a number of computing modules. The example of FIG. 2 shows an error detection module 204 and a backup power control module 206. As used herein, a computing module can include program code, e.g., computer executable instructions, hardware, firmware, and/or logic. But a computing module at least includes instructions executable by the processing resource 202, e.g., in the form of modules, to perform particular actions, tasks, and functions described in more detail herein in reference to FIGS. 4, 5, and 6. Instructions associated with a particular module, e.g., modules 204 and 206, when executed by the processing resource 202 can also be referred to and function collectively as a component and/or computing engine. As used herein, an engine can include hardware firmware, logic, and/or executable instructions. But an engine at least includes hardware e.g., logic in the form of an application specific integrated circuit (ASIC), to perform particular actions, tasks and functions described in more detail herein in reference to FIGS. 4, 5, and 6.

Engines and/or the number of modules, e.g., 204 and 206 shown in FIG. 2, can be sub-engines/modules of other engines/modules and/or combined to perform particular actions, tasks, and functions within a particular system and/or computing device. Engines and/or modules described herein can be located in a single system and/or computing device or reside in separate distinct locations in a distributed computing environment, e.g., cloud computing environment.

Figure 4:
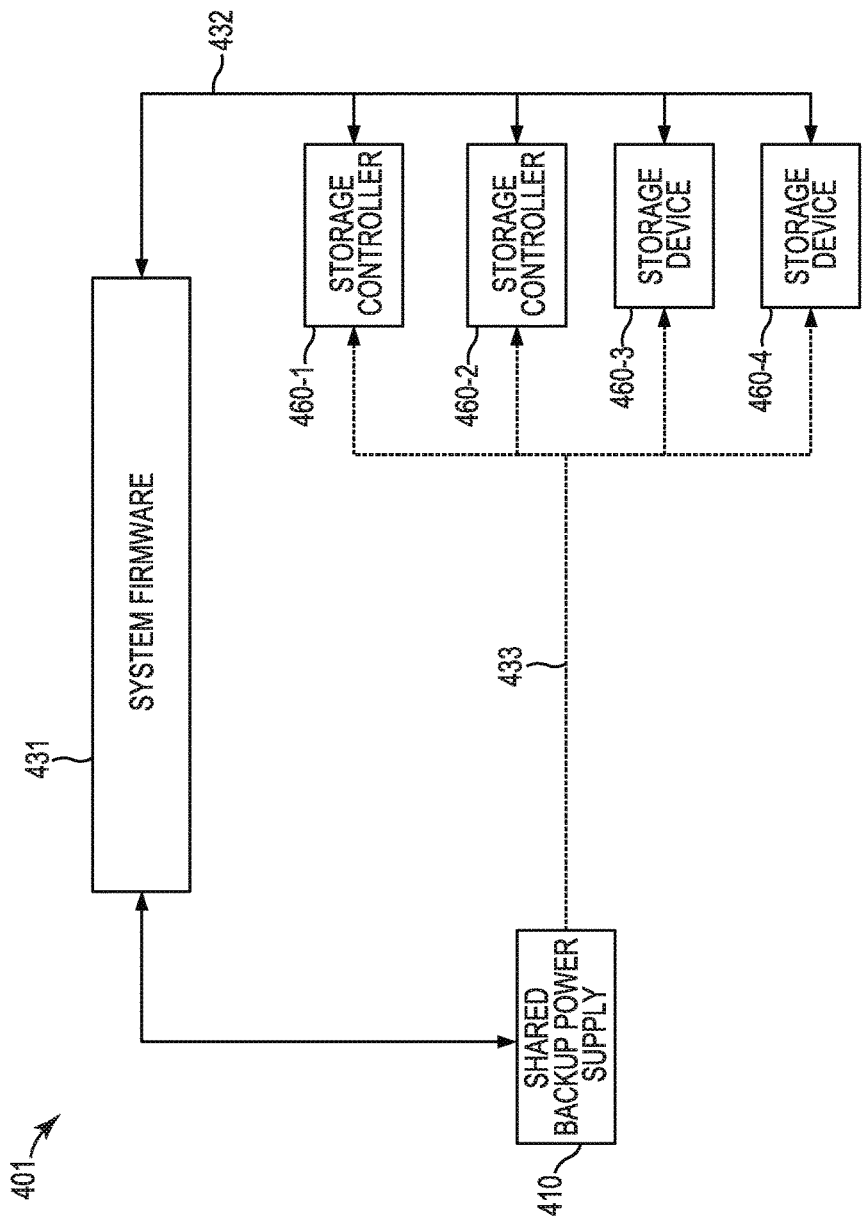
FIG. 4 illustrates a flow diagram of an information and battery power communication path between a plurality of loads and a shared backup power supply according to the present disclosure.
Figure 5:
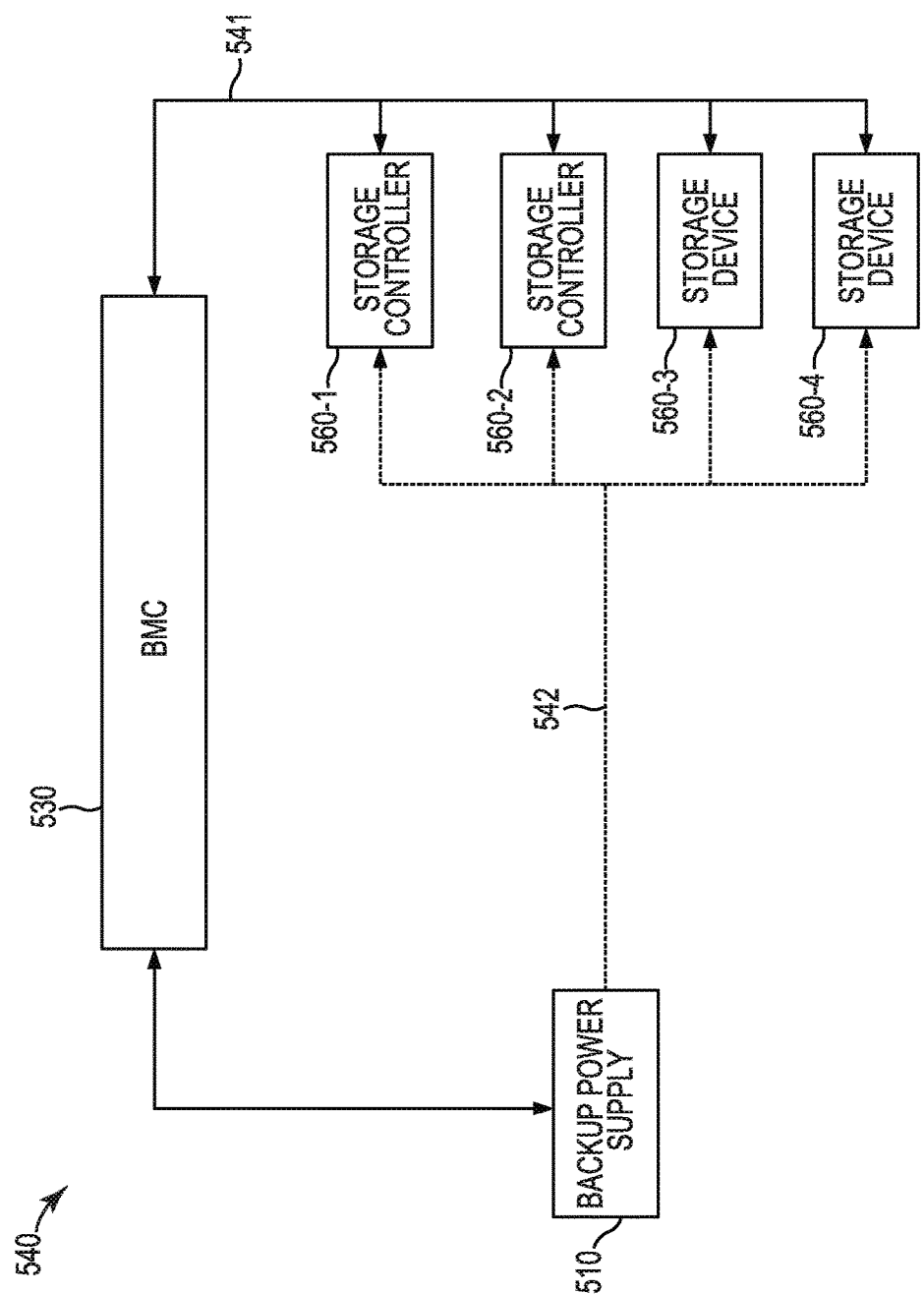
FIG. 5 further illustrates a flow diagram of an information and battery communication path between a plurality of loads and a shared backup power supply according to the present disclosure.
Figure 6:
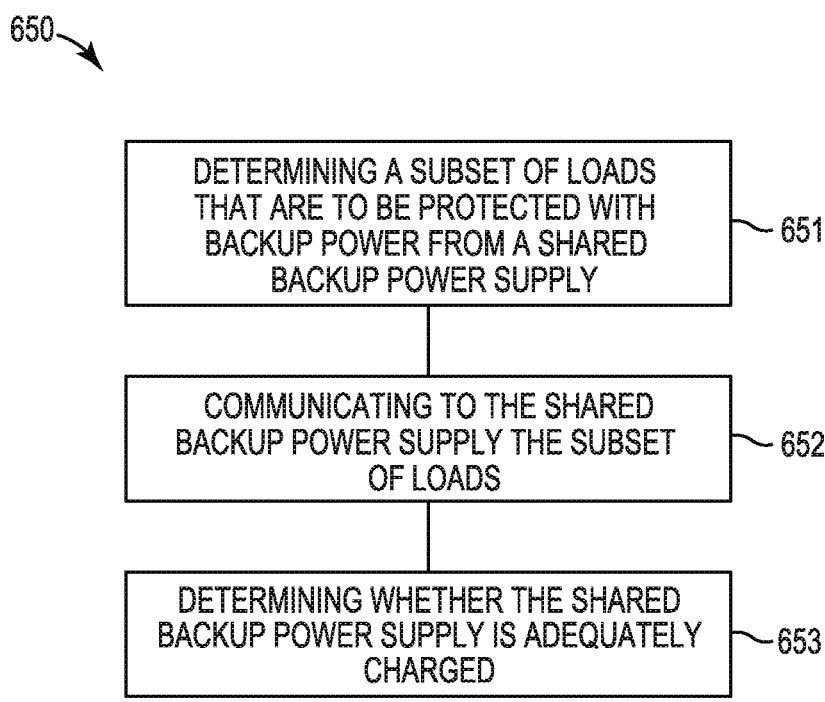
FIG. 6 illustrates a flow diagram of an example method of backup power and load discovery according to the present disclosure.

The system 200 can perform a number of functions and operations as described in FIGS. 4, 5, and 6, and include the apparatus and methods for backup power and load discovery as described herein.

The shared backup power supply 210 can be a battery that is external to the node 222 and external to the chassis/host controller 212 supporting the node 222. The shared backup power supply 210 can provide power to the node 222. The shared backup power supply 210 can support different chassis/host controllers, e.g., not shown, and different MUXs (not shown) to support a plurality of nodes on different chassis.

The node 222 can include a main logic board (MLB) 228, and the MLB 228 can include system firmware 231. The system firmware 231 can include a number of components, such as BIOS and/or a BMC unit. The MLB 228 components can allow the node 222 to communicate with the shared backup power supply 210 and the chassis/host controller 212. For example, a BMC unit can communicate from BIOS to the shared backup power supply 210, a subset of the loads 260 that are to be protected by the shared backup power supply 210. In some examples, more than one subset of loads 260 can be identified for protection by the shared backup power supply 210. In another example, BIOS can determine an amount of time it will take for the shared backup power supply 210 to charge in order to provide backup power to the loads 260 or a subset of the loads 260, and can communicate the determined amount of time to the loads 260 and/or the subset of the loads 260.

Signal and control lines can connect the shared backup power supply 210 to the chassis/host controller 212 and to the MUX 214. The MUX 214 and the chassis/host controller 212 can be coupled to the node 222 via a signal line 216. The signal line 216 can provide for the install, registering, data, and clocking of the node 222 with the chassis/host controller 212.

In some examples, the control logic (not illustrated in FIG. 2) can be coupled to the node via a control signal and power lines 226. For example, the node 222 can provide a signal to the signal lines 226 and 216 when data is to be backed up to non-volatile memory. The signal lines 216 and 226 also couple the chassis/host controller 212 to the node 222 and the control logic.

The system firmware 231 can allow the node 222 to communicate with the shared backup power supply 210. For instance, the system firmware 231 can include a BMC unit. As described herein, a BMC unit can be a specialized microcontroller embedded on the motherboard of the node 222, and that manages the interface between system management software and platform hardware. For example, different types of sensors built into the system 200 can report to the BMC unit on parameters such as temperature, cooling fan speeds, power status, and operating system status, among other parameters.

The shared backup power supply 210 can be connected to the node 222 such that the only signal that the node 222 receives from the backup power supply is the backup power supply's output. For example, the output from the shared backup power supply 210 to the plurality of loads 260 is only enabled when the shared backup power supply 210 has determined that it has enough charge to support the loads 260 and/or a subset of the loads 260. Until that time, the loads 260 are unaware if the shared backup power supply 210 is present in the system 200 or what state the shared backup power supply 210 is in.

Figure 3:
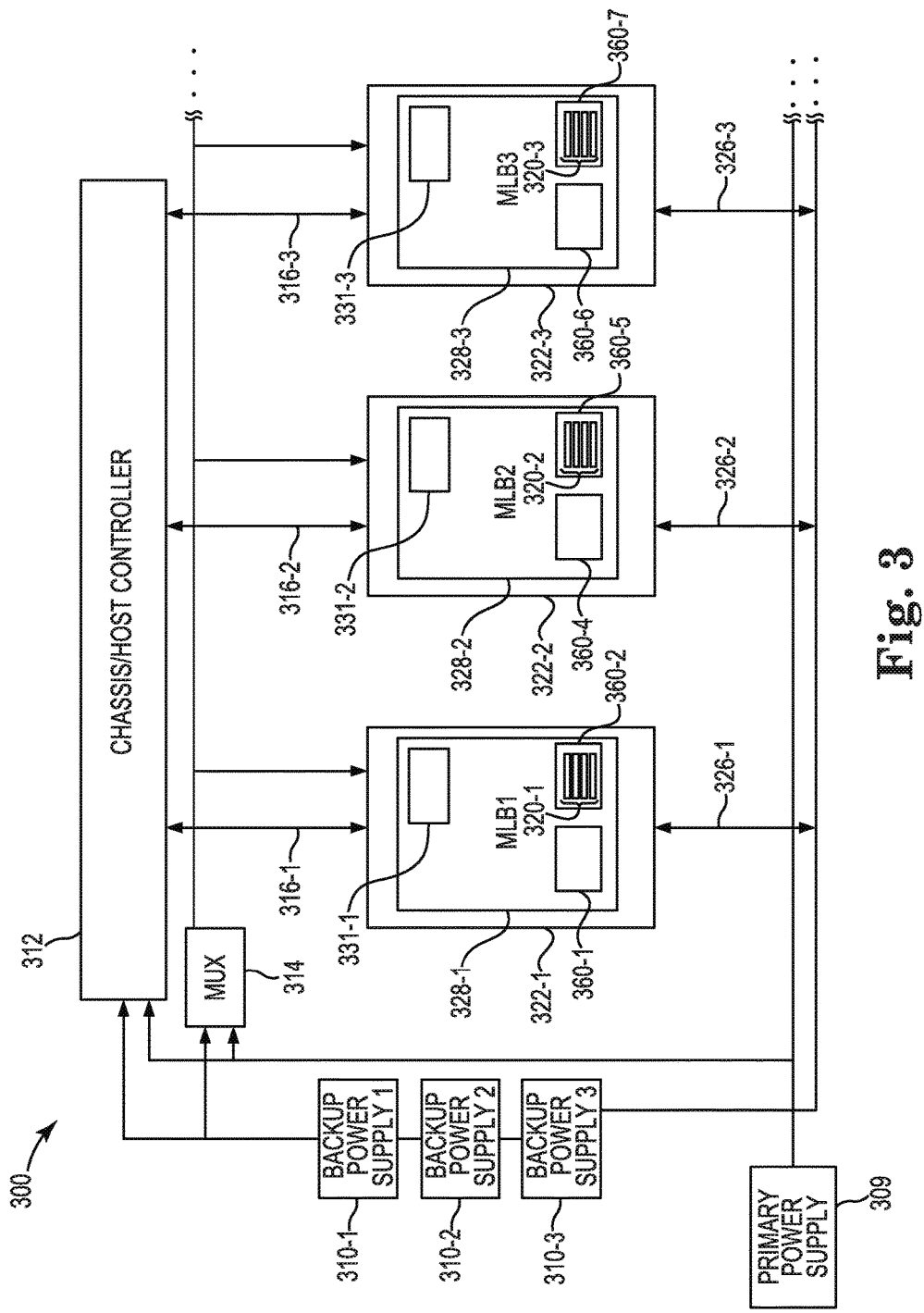
FIG. 3 illustrates a detailed block diagram of an example of a system for backup power and load discovery according to the present disclosure.

Furthermore, the system firmware 231 can facilitate communication between the shared backup power supply 210 and the loads 260, as discussed further in relation to FIGS. 3, 4, and 5. The system 200 is further configured such that the only output the loads 260 receive from the shared backup power supply 210 is the battery power output from the shared backup power supply 210.

The backup power control module 206 can have instructions stored in a non-transitory storage medium (e.g., memory resource 108) to communicate between the system firmware 231 and the plurality of loads to determine how many loads among the plurality of loads 260 are to be protected with backup power. Further, as discussed in relation to FIGS. 4, 5, and 6, the backup power control module 206 can communicate the number of loads 260 that are to be protected with backup power from the shared backup power supply 210 between the node 222 and the shared backup power supply 210 and can configure the shared backup power supply 210 in response.

In a number of examples, the backup power control module 206 can receive, from the system firmware 231 of the node 222, an indication of the number of nodes that are to be protected with backup power from the shared backup power supply 210. Also, as discussed in relation to FIGS. 4, 5, and 6, the backup power control module 206 can use the system firmware 231 to determine an amount of time that it will take to charge the shared backup power supply 210 in order to provide backup power to the plurality of loads 260 and/or a subset of the plurality of loads 260. Once this amount of time is determined, the backup power control module 206 can communicate the determined amount of time to the plurality of loads 260 and/or a subset of the plurality of loads 260. In some examples, the backup power control module 206 can also communicate information regarding a state of the shared backup power supply 210 to the plurality of loads 260 and/or a subset of the plurality of loads 260.

Further, the error detection module 204 can have instructions stored in a non-transitory storage medium (e.g., memory resource 208) to use the system firmware 231 (such as a BMC unit) to communicate error information to the plurality of loads 260 and/or a subset of the plurality of loads 260, in response to an error which causes the shared backup power supply 210 to cease providing power to the plurality of loads 260 and/or a subset of the plurality of loads 260. As discussed further in relation to FIG. 5, the error detection module 204 can communicate between the shared backup power supply 210 and the plurality of loads 260 and/or a subset of the plurality of loads 260, in an out-of-band manner from the BIOS.

Also, the error detection module 204 can have instructions to compare a state of the shared backup power supply 210, as determined by the node 222, to a true state of the shared backup power supply 210. As used herein, a true state of the shared backup power supply 210 is the state of the shared backup power supply 210 as determined by the shared backup power supply 210 itself, rather than other components within system 200. In some examples, the system firmware, such as a BMC unit, can compare the state of the shared backup power supply 210 as reported by each load among the plurality of loads 260, to the true state of the shared backup power supply 210. The error detection module 204 can determine if a discrepancy exists between the state of the backup power supply 210 as determined by the node 222 and/or each of the plurality of loads 260 and the true state of the backup power supply 210. Determining if a discrepancy in the state of the shared backup power supply 210 exists allows the error detection module 204 the ability to detect cabling errors between a load (e.g., load 260-4) and the shared backup power supply 210. Further, each load of the plurality of loads 260 can identify a different state for the shared backup power supply 210. For instance, load 260-2 may report that shared backup power supply 210 is off-line, and load 260-3 may report that shared backup power supply 210 is on-line. By each load of the plurality of loads 260 identifying a state for the shared backup power supply 210, different cabling errors can be isolated to a particular load. In some examples, however, the plurality of loads 260 may collectively report a state of the shared backup power supply 210.

FIG. 3 illustrates a detailed block diagram of an example of a system 300 for backup power and load discovery according to the present disclosure. Although illustrated in simplified form in FIG. 3, it is to be understood that shared backup power supply 310-1, 310-2, and 310-3 include the components of the shared backup power supply 210 illustrated in FIG. 2.

As illustrated in FIG. 3, the system 300 can include a plurality of nodes, where each node has a separate shared backup power supply. For example, the system 300 can include a plurality of nodes 322-1, 322-2, 322-3 (herein referred to as nodes 222), and each of the nodes 222 can have an associated shared backup power supply. That is, node 322-1 can be associated with shared backup power supply 1 (e.g., 310-1), node 322-2 can be associated with shared backup power supply 2 (e.g., 310-2), and node 322-3 can be associated with shared backup power supply 3 (e.g., 310-3).

Also, as described in relation to FIGS. 1 and 2, each of the nodes 222 can have a plurality of components. For instance, each of the nodes 222 can have an MLB (e.g., 328-1, 328-2, and 328-3) and each of the plurality of MBL's can include system firmware (e.g., 331-1, 331-2, 331-3). Each system firmware on a node can have BIOS and a BMC unit among other system firmware components. While FIG. 3 shows three (3) nodes 322-1, 322-2, and 322-3, the system 300 can have fewer or more nodes than illustrated. Similarly, each of the plurality of nodes 322 can include a plurality of loads (e.g., loads 360-1, . . . , 360-7, hereinafter referred to as loads 360). For example, the nodes 322 may host six (6) or more loads (e.g., two loads per node). In some examples, more or fewer loads can be hosted in a node, and each of the nodes 322 can host a different number of loads. For instance, node 322-1 can host four (4) loads (e.g., two storage controllers and two storage devices) while node 322-2 can host six (6) loads (e.g., three storage controllers and three storage devices).

In this manner, each of the plurality of nodes 322 can include a plurality of loads, and the plurality of loads within a node can have a shared backup power supply. In other words, the shared backup power supply associated with a particular node is shared among the plurality of loads associated with that node.

FIG. 4 illustrates a flow diagram 401 of an information and battery power communication path between a plurality of loads and a shared backup power supply according to the present disclosure. Particularly, FIG. 4 illustrates a flow diagram 401 of communication between a plurality of storage controllers and storage devices and the shared backup power supply 410 during startup (e.g., system boot).

FIG. 4 illustrates the communication between these components, and battery power provided by the shared backup power supply 410, and is not intended to illustrate structural components, as such components are illustrated in FIGS. 1-3.

As discussed in relation to FIGS. 1-3, a node (e.g., node 222 illustrated in FIG. 2, and the plurality of nodes 322 illustrated in FIG. 3) can host a number of loads. For example, as illustrated in FIG. 4, the node can include two storage controllers (e.g., loads 460-1 and 460-2) and two storage devices (e.g., 460-3 and 460-4). The information and battery power communication path can include system firmware (e.g., system firmware 131 illustrated in FIG. 1, system firmware 231 illustrated in FIG. 2, and system firmware 331 illustrated in FIG. 3) as well as the shared backup power supply 410 (e.g., shared backup power supply 110 illustrated in FIG. 1, and shared backup power supply 310-1, 310-2, and 310-3 illustrated in FIG. 3). As described herein system firmware can include a BMC unit and BIOS among other system firmware components. Furthermore, the information and battery power communication path can include the system firmware 431 (e.g., BIOS) associated with a particular node. In this manner, BIOS associated with a particular node, and the BMC unit associated with that particular node, can facilitate communication between a plurality of loads hosted on that node, and the shared backup power supply 410 associated with that node. Line 432 illustrates the communication path between the loads 460, the system firmware 431, and shared backup power supply 410. Line 433 illustrates the battery power provided by the shared backup power supply 410 to the loads 460.

During startup of a node (e.g., node 122 illustrated in FIG. 1), system firmware 431 (e.g., such as BIOS) within the node can communicate with all loads 460 to determine how many (e.g., a subset) of the loads 460 are to be protected with backup power. For example, referring to FIG. 4, the system firmware 431, such as BIOS, can communicate with the loads 460 to determine that load 460-1 and load 460-2 are to be protected with backup power from the shared backup power supply 410. Once the BIOS determines the number of loads that are to be protected with backup power, the BIOS can communicate the determined number to the shared backup power supply 410, through another component of the system firmware, such as a BMC unit. In response to receiving the determined number of loads that are to be protected with backup power, the BMC unit can configure the shared backup power supply 410 with the correct number of loads (e.g., the subset of the loads 460). Similarly, the shared backup power supply 410 can determine the charge level that will be used in order to provide backup power to the loads 460 and/or a subset of the loads 460 in the node.

In some examples, the system firmware 431 can determine the state of the shared backup power supply 410 and determine how long the shared backup power supply 410 will have to charge before it can turn on and send an output signal to the loads 460. In other words, the system firmware 431 can determine a current charge level of the shared backup power supply 410, and determine based on the current charge level, how long the shared backup power supply 410 will have to charge before it can provide backup power to the loads. As discussed previously herein, the loads are unaware of the existence of the shared backup power supply 410 until the shared backup power supply 410 sends an output to the loads 460 and/or a subset of the loads 460.

In response to determining the state of the shared backup power supply 410 and the charge time necessary to adequately charge the shared backup power supply 410 to provide backup power to the plurality of loads, the system firmware 431 can communicate information back to the plurality of loads 460. For example, the system firmware 431 can communicate the state of the shared backup power supply 410 to the plurality of loads. In another example, the system firmware 431 can communicate to the plurality of loads, the duration of time until the shared backup power supply 410 is adequately charged (e.g., fully charged). As used herein, an adequate charge of the shared backup power supply refers to a level of power stored in the shared backup power supply that is capable of providing backup power supply to a specified number of loads.

By communicating information on the state of the shared backup power supply 410 to the plurality of loads, the plurality of loads can identify cabling errors between the shared backup power supply 410 and the plurality of loads. Each load 460 can be connected, via the node, to the shared backup power supply 410. This connection (e.g., cable) provides power from the shared backup power supply 410. In this manner, the load can identify if the shared backup power supply 410 is online, by receiving power from the shared backup power supply 410. A cabling error occurs when either a user (e.g., user of system 100 illustrated in FIG. 1, system 200 illustrated in FIG. 2, and/or system 300 illustrated in FIG. 3) failed to properly install the cable connecting the load to the shared backup power supply 410, or the cable itself failed which results in no connection from the shared backup power supply 410 to the loads 460 and/or a subset of the loads 460.

Once the plurality of loads 460 receive information on the state of the shared backup power supply 410 from the system firmware 431 (e.g., such as BIOS), the plurality of loads 460 can use the information in a number of ways. For example, if the information indicates to the plurality of loads 460 that the shared backup power supply 410 is adequately charged and online, the plurality of loads 460 can determine that a cabling error exists if they do not see the output from the shared backup power supply 410. As described herein, each of the plurality of loads can independently determine a state of the backup power supply 410 in order to determine if a cabling error exists. Similarly, the plurality of loads 460 can collectively determine a state of the backup power supply 410 in order to determine if a cabling error exists. This error condition can be communicated to a user and used to verify that the cable connecting the plurality of loads to the shared backup power supply 410 is installed correctly and/or properly functioning.

In another example, if the information received from the system firmware 431 indicates to the plurality of loads that the shared backup power supply 410 is charging, the information can indicate to the plurality of loads the amount of time for the shared backup power supply 410 to achieve an adequate charge. The charge time can be used to set internal timers in the plurality of loads using the system firmware 431 (e.g., such as a BMC unit), and after the internal timers expire, the plurality of loads can assume that the shared backup power supply 410 is charged. If, at that time, the plurality of loads 460 do not receive output from the shared backup power supply 410, then the plurality of loads 460 can determine that a cabling error exists.

FIG. 5 further illustrates a flow diagram 540 of an information and battery communication path between a plurality of loads and a shared backup power supply according to the present disclosure. Particularly, FIG. 5 illustrates a flow diagram 540 of communication between the plurality of loads 560 and the shared backup power supply 510 during runtime. FIG. 5 illustrates the communication between these components, and battery power provided by the shared backup power supply 510, and is not intended to illustrate structural components, as such components are illustrated in FIGS. 1, 2 and 3. Line 541 illustrates the communication path between the loads 560, a BMC unit 530, and shared backup power supply 510. Additionally, line 542 illustrates the battery power provided by the shared backup power supply 510 to the loads 560.

During runtime, if an error occurs which causes the shared backup power supply 510 to cease providing output to the plurality of loads, the BMC unit 530 can communicate error information to the plurality of loads 560. Error information provided by the BMC unit 530 to the plurality of loads 560 can include the reason for the error, and/or other pertinent error information. As illustrated in FIG. 5, the communication between the shared backup power supply 510 and the plurality of loads 560, through the BMC unit 530, can be out-of-band, in that the communication path does not pass through the BIOS of the node. While FIG. 5 illustrates the use of a BMC unit to communicate between the backup power supply 510 and the plurality of loads 560, examples are not so limited, and other system firmware components can be used to communicate error information to the plurality of loads 560.

FIG. 6 illustrates a flow diagram of an example method 650 of backup power and load discovery according to the present disclosure. At 651, the method 650 can include determining, using system firmware (e.g., system firmware 131 illustrated in FIG. 1, system firmware 231 illustrated in FIG. 2, and/or system firmware 331-1, 331-2, and 331-3 illustrated in FIG. 3), a subset of loads that are to be protected with a shared backup power supply (e.g., shared backup power supply 110 illustrated in FIG. 1). In some examples, as described herein, BIOS of a node can determine the subset of loads that are to be protected with backup power from the shared backup power supply, although examples are not so limited. As described in relation to FIGS. 1, 2, 3, 4, and 5, the subset of loads can be determined at startup of a node. In determining the subset of loads that are to be protected with the shared backup power supply, the system firmware of the node can communicate with the loads, such as storage controllers and/or storage devices, within the node.

At 652, the method 650 can include communicating to the shared backup power supply the determined subset of loads. For example, once the system firmware (e.g., such as BIOS) of the node determines the subset of loads that are to be protected with backup power, the BIOS can communicate the determined subset to the shared backup power supply through another component of the system firmware, such as a BMC unit. In response to the shared backup power supply receiving the determined subset of loads, the BMC unit can configure the shared backup power supply with the determined number of loads such that the shared backup power supply can charge for an adequate amount of time to provide backup power to the determined subset of loads.

As discussed further in relation to FIGS. 1, 2, 3, 4, and 5, the system firmware (e.g., for instance, BIOS of the node) can further determine the state of the shared backup power supply. In determining the state of the shared backup power supply, the system firmware can determine if the shared backup power supply is online, if it is off-line, and/or if it is charging. However, examples are not so limited, and the state of the shared backup power supply can be a charge level of the shared backup power supply, the presence of the shared backup power supply itself, and/or the presence of charging errors in the shared backup power supply.

At 653, the method 650 can include determining, using the system firmware, whether the shared backup power supply is adequately charged to provide backup power to the subset of loads. For example, a BMC unit on a node can periodically (e.g., at set time periods) determine the state of the shared backup power supply during runtime. The BMC unit can then communicate to the subset of loads whether the shared backup power supply is adequately charged or not.

In some examples, the system firmware (e.g., such as the BIOS) can communicate to the subset of loads, a maximum amount of time for the shared backup power supply to adequately charge to provide backup power to the subset of loads, in response to the system firmware determining that the shared backup power supply is not adequately charged. For instance, if the system firmware determined the state of the shared backup power supply during runtime, and determined that the shared backup power supply did not have enough power to provide backup power to the subset of loads, the system firmware could communicate to the subset of loads, a maximum amount of time (e.g., a maximum amount of charging time) that would be needed until the shared backup power supply could provide backup power to the subset of loads. As used herein, the maximum amount of time refers to a maximum amount of charging time for the shared backup power supply. The maximum amount of time could be based on the amount of time needed to charge the shared backup power supply from a zero power state, an amount of time needed to charge the shared backup power supply from a baseline value, and/or other measurements of time. Once the maximum amount of time has lapsed (e.g., expired), if the subset of loads determine that no backup power is provided by the shared backup power supply, the subset of loads can determine that a cabling error exists.

In some examples, the method 650 can include communicating to the subset of loads, using the system firmware, a state change of the shared backup power supply in response to the system firmware detecting the state change. As used herein a state change refers to a change in the state of the shared backup power supply. For instance, the system firmware (e.g., BIOS and/or a BMC unit, among other examples) can periodically determine the state of the shared backup power supply. The system firmware can determine at first point in time the state of the shared backup power supply, for instance, that the shared backup power supply is off-line, and the system firmware can determine that at second point in time the state of the shared backup power supply is different, for instance, that it is now on-line. By determining that the shared backup power supply went from being off-line to on-line, the system firmware can detect a state change. In response to detecting this state change, the system firmware can communicate the state change to the subset of loads. In response to the system firmware communicating the state change to the subset of loads, a cabling error can be identified if the state of the shared backup power supply as determined by each of the loads after the state change, does not match the true state of the shared backup power supply after the state change.

In some examples, the method 650 can include determining an amount of time that it will take to charge the shared backup power supply. In response to determining the state of the shared backup power supply, the system firmware can determine and send to the subset of loads, an amount of time for the shared backup power supply to adequately charge. Further, the method 650 can include communicating to the determined subset of loads, the time to charge the shared backup power supply. In response to receiving the amount of time for the shared backup power supply to adequately charge, the subset of loads can set internal timers in the node and/or in each of the plurality of loads which indicate when the shared backup power supply should be adequately charged. If, at the time the internal timers expire, the subset of loads do not receive output from the shared backup power supply, the subset of loads can determine that a cabling error exists.

In some examples, the method 650 can include receiving, by the subset of loads and from a BMC unit in an out-of-band manner, information regarding a cabling error between the shared backup power supply and the subset of loads. As described further in relation to FIG. 5, system firmware can include BIOS of the node, and a BMC unit of the node. In such examples, the BMC unit can communicate directly with the subset of loads without communicating through the BIOS, information regarding an identified cabling error.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples may be capable of being made without departing from the spirit and scope of the system and method of the present disclosure, this specification merely sets forth some of the many possible example configurations and implementations.

What is claimed is:

1. A backup power and load discovery system, comprising:
 a shared backup power supply controlled by a backup power control module included in the shared backup power supply;
 a node coupled to the shared backup power supply, wherein the node supports a plurality of loads and includes:
  a main logic board (MLB) that includes system firmware to determine a subset of the plurality of loads that are to be protected by the shared backup power supply and communicate the subset to the shared backup power control module; and an error detection module included in the shared backup power supply, the error detection module to determine a state of the shared backup power supply and use the system firmware to communicate error information to the plurality of loads.

2. The system of claim 1, comprising the backup power control module to configure the shared backup power supply to protect the subset.

3. The system of claim 1, comprising the system firmware to determine the subset during startup of the node.

4. The system of claim 1, comprising the system firmware to determine a current charge level of the shared backup power supply.

5. The system of claim 4, comprising the system firmware to determine an amount of time to charge the shared backup power supply from the current charge level, to provide backup power to the subset.

6. The system of claim 5, comprising the system firmware to communicate the determined amount of time to the subset and to set an internal timer in each of the plurality of loads to expire at the end of the determined amount of time indicating that the shared backup power supply is charged.

7. A non-transitory machine readable medium storing instructions executable by a processing resource to cause a computer to:
    determine a subset of a plurality of loads of a node that are to be protected by a shared backup power supply;
    communicate the subset between the node and a shared backup power control module via system firmware of the node to configure the shared backup power supply based on the determined subset;
    communicate, via an error detection module included in the shared backup power supply, error information to the plurality of loads supported by the node;
    determine, via the error detection module, a state of the shared backup power supply;
    communicate, via the shared backup power control module included in the shared backup power supply, the state of the shared back up power supply between the node and the error detection module; and
    communicate the state from the system firmware to the subset of the plurality of loads.

8. The medium of claim 7, including instructions to determine a true state of the shared backup power supply as determined by the shared backup power supply.

9. The medium of claim 8, including instructions to compare the state of the shared backup power supply as determined by each of the loads of the subset to the true state of the shared backup power supply as determined by the shared backup power supply.

10. The medium of claim 9, including instructions to determine that a cabling error exists in response to detecting a discrepancy between the true state of the shared backup power supply and the state of the shared backup power supply as determined by each of the loads of the sub set.

11. The medium of claim 7, including instructions to communicate error information to the subset, in response to an error which causes the shared backup power supply to cease providing power to the subset.

12. The medium of claim 11, including instructions to communicate the error information to the subset out-of-band with respect to a Basic Input/Output System (BIOS) of the node.

13. A method of backup power and load discovery, comprising:
    determining, using system firmware of a node, a subset of loads among a plurality of loads in the node that are to be protected with backup power from a shared backup power supply;
    communicating to a shared backup power control module included in the shared backup power supply, using the system firmware, the subset of loads;
    communicating, via an error detection module included in the shared backup power supply, error information to the plurality of loads supported by the node;
    determining, via the error detection module, a state of the shared backup power supply;
    communicating, via the shared backup power control module included in the shared backup power supply, the state of the shared back up power supply between the node and the error detection module; and
    determining, using the system firmware, whether the state of the shared backup power supply is adequately charged to provide backup power to the subset of loads.

14. The method of claim 13, comprising communicating to the subset of loads, using the system firmware, a maximum amount of time for the shared backup power supply to adequately charge to provide backup power to the subset of loads, in response to the system firmware determining that the shared backup power supply is not adequately charged.

15. The method of claim 13, comprising communicating to the subset of loads, using the system firmware via the error detection module, the state change of the shared backup power supply in response to the system firmware detecting the state change.

16. The method of claim 13, comprising communicating, via the error detection module, the error information to the subset out-of-band with respect to a Basic Input/Output System (BIOS).

17. The method of claim 16, comprising determining, by the error detection module, whether a discrepancy in the state of the shared backup power supply exists.

18. The method of claim 13, comprising reporting to the shared backup power supply, by each of the loads of the subset via the system firmware, the state of the shared backup power supply.

19. The method of claim 18, comprising comparing, by the system firmware, the state of the shared backup power supply as determined by each of the loads of the subset to a true state of the shared backup power supply as determined by the shared backup power supply.

20. The method of claim 13, wherein the error information is communicated to the subset via the error detection module in response to an error which causes the shared backup power supply to cease providing power to the subset.

* * * * *